April 19, 1966    H. C. KORNEMANN ETAL    3,246,478
PROCESS AND APPARATUS FOR SEPARATING LOW-BOILING GAS MIXTURES
Filed April 8, 1963      4 Sheets-Sheet 1

INVENTORS
HENRY C. KORNEMANN
ANTON E. HITTL
HELMUT KOEHN
LYLE J. LaPLANTE
RICHARD L. SHANER

BY Leo A. Plumm, Jr.
ATTORNEY

United States Patent Office 3,246,478
Patented Apr. 19, 1966

3,246,478
PROCESS AND APPARATUS FOR SEPARATING
LOW-BOILING GAS MIXTURES
Henry C. Kornemann, Kenmore, Anton E. Hittl, Pleasantville, Helmut Koehn, Hartsdale, Lyle J. La Plante, Grand Island, and Richard L. Shaner, Williamsville, N.Y., assignors to Union Carbide Corporation, a corporation of New York
Filed Apr. 8, 1963, Ser. No. 271,351
14 Claims. (Cl. 62—13)

This application is a continuation-in-part of our application, Serial No. 32,952, filed May 31, 1960, now abandoned.

This invention relates to an improved process and apparatus for separating low-boiling gas mixtures such as air, and more particularly to improvements of such process and apparatus resulting in the highly efficient production of widely varying quantities of liquid oxygen and nitrogen as well as gaseous oxygen and nitrogen.

At the present time, the consumption pattern of low boiling gases such as oxygen and nitrogen is changing appreciably. For example, some industries such as steel production have increased their consumption of oxygen manifold, which has required corresponding changes in the manner of supplying the product most economically. Many large production plants for liquid oxygen have been located in or near large steel production centers so that the liquid product could be transported most economically by rail or highway truck to the customer. However, the demand from many of these oxygen consumers has increased very substantially in recent years to the point where it is now usually more economical to supply the product as gas from an on-site air-separation plant or by pipelines from a nearby gas producing plant.

Furthermore, the increase of on-site gas producing plants plus other factors has resulted in certain geographical shifts in the location of liquid oxygen and nitrogen consumers. For example, increased consumption of liquid oxygen and nitrogen has occurred for rocket motors and other associated uses at remote test locations and defense installations. The location of these consumption points is often subject to change.

An additional consideration is that prior art gas producing plant cycles have generally been more efficient than liquid cycles for producing oxygen or nitrogen products for ultimate use as a gas. There has long been a need for a liquid producing plant with the separating efficiency of the gas cycle so as to produce simultaneously high-purity oxygen, high-purity nitrogen, and to achieve high recovery of argon.

It is the principal object of the present invention to provide an improved system for separating low-boiling gas mixtures wherein the various components may be recovered in a highly efficient manner and in widely varying proportions of either or both the liquid and gaseous state.

Another object is to provide an improved system for separating air by low temperature rectification wherein oxygen and nitrogen may be efficiently recovered as either liquid or gas.

Still another object is to provide an air separation system wherein liquid oxygen and nitrogen, and gaseous oxygen and nitrogen may be simultaneously recovered as products.

A further object is to provide a method of economically adapting existing liquid oxygen producing plants for the simultaneous production of liquid nitrogen.

A still further object is to provide a method of economically adapting existing gaseous oxygen producing plants for the simultaneous production of liquid oxygen and liquid nitrogen.

An additional object is to provide a liquid air component producing cycle with the higher separating efficiency of a gaseous air component producing cycle so as to efficiently and simultaneously produce high-purity oxygen, high-purity nitrogen and to achieve high recovery of argon.

These and other objects and advantages of this invention will be apparent from the following description and accompanying drawing in which.

Figure 1:
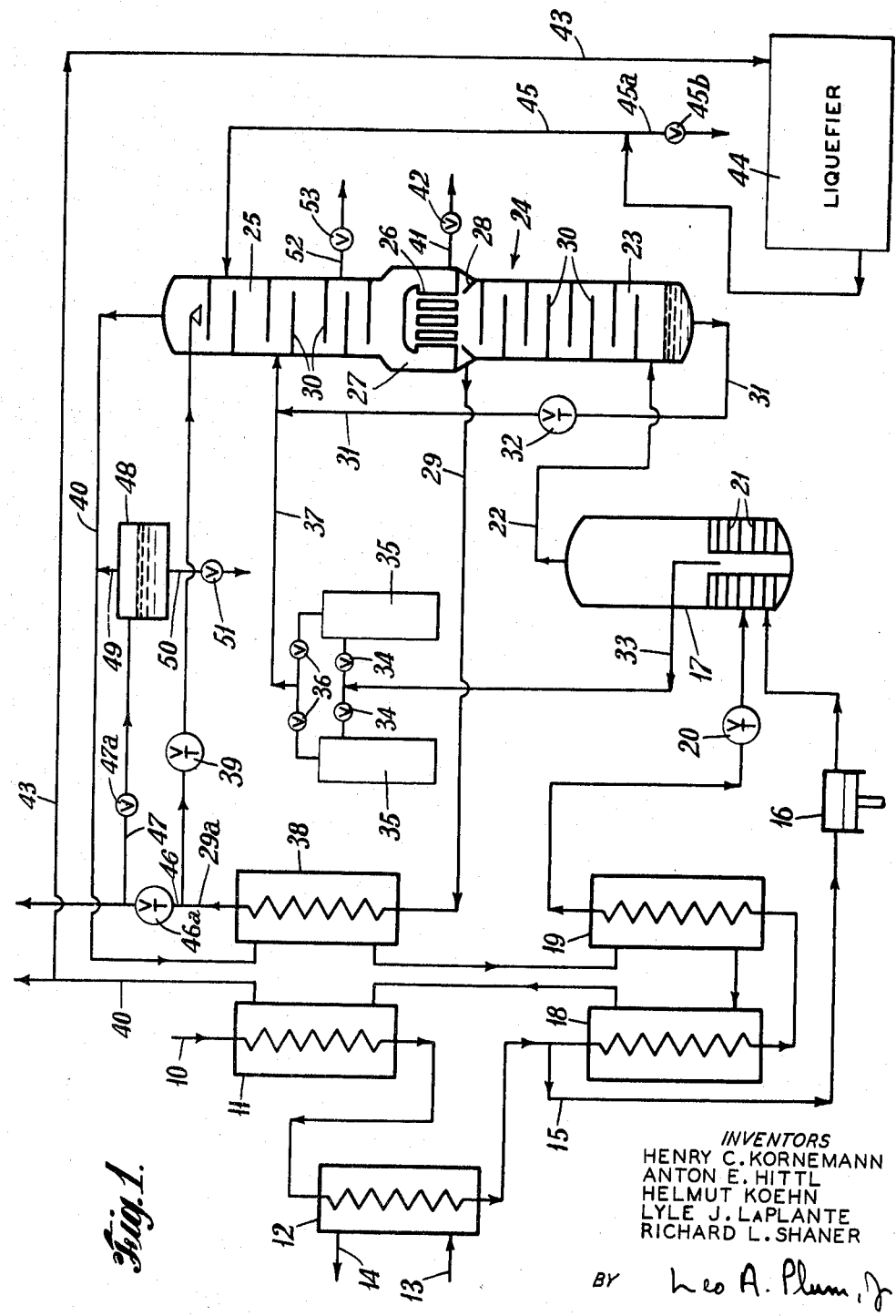
FIG. 1 shows a flow diagram of a process for separating low-boiling gas mixtures according to the present invention wherein the feed stream is supplied at a relatively high pressure.

This invention satisfying the aforestated objects may be achieved by rectifying a gas mixture in the conventional manner, then liquefying a separated gas mixture component after such rectification, returning at least part of the liquefied component to the rectification zone, and withdrawing a separated liquid component from the rectification zone as a product for use outside the separation plant.

More specifically, the process of this invention comprises providing a pressurized gas mixture feed stream, cooling such feed stream, rectifying the cooled feed in a rectification zone for separating the gas mixture into components, withdrawing at least one separated gas phase component from said rectification zone, warming the withdrawn separated gas phase component by heat exchange with said feed stream, liquefying said separated gas phase component, returning at least part of the so liquefied component to said rectification zone, and withdrawing at least one separated liquid phase component from the rectification zone for use as a product stream.

The amount of gas phase component withdrawn, liquefied, and returned to the rectification zone, and the amount of separated liquid phase component withdrawn as a product are preferably regulated so as to maintain the heat balance required in the rectification zone. That is, if liquid phase component is to be withdrawn and used outside the rectification zone as a product, than the lost refrigeration must be restored to the rectification zone. This can be done by returning to the rectification zone an amount of liquefied, formerly gas phase component sufficient to restore the needed refrigeration. The amount of gas phase component withdrawn, liquefied, and returned to the rectification zone should be a "thermal equivalent" of the amount of liquid phase component withdrawn from the rectification for use as product, taking into account the need to make up for irreversibilities and heat leaks, considering as well, any refrigeration sources. That the withdrawn and returned streams are "thermally equivalent" means that the two streams contain the same total quantity of refrigeration, so that the total refrigeration supplied is equivalent to the total refrigeration withdrawn. The amounts and temperatures of the streams need not be equivalent for a larger quantity of a given liquid provided at a higher temperature could be the thermal equivalent of a smaller quantity of liquid at a lower temperature.

In regard to this maintenance of the required heat balance in the rectification zone by returning an amount of liquid that is a thermal equivalent of the liquid withdrawn, other possible heat leaks and refrigeration sources should be considered. For example, when considering an air separation plant not equipped with a work expander and requiring liquid addition for its refrigeration, the liquid streams added to the rectification zone from the liquefier should be thermally equivalent to the total liquid product stream withdrawn plus process irreversibilities and heat inleak. When considering an air separation plant equipped with a work expander for producing refrigeration from the pressurized feed stream, the liquid stream added to the rectification zone from the liquefier should be the thermal equivalent of the total liquid product streams withdrawn plus process irreversibilities and heat leak and less the refrigeration produced from the feed stream. The term thermal equivalency means, therefore, that the total liquid streams returned to the rectification zone should have the same refrigeration content as the total liquid product streams withdrawn after accounting for irreversibilities and heat inleak and for any refrigeration produced from the compressed feed stream such as by a work expansion step.

By the process of this invention, extremely high purity separated liquids are made available. For example, the nitrogen effluent from a low pressure column could be liquefied and used as a product, provided the lost refrigeration was returned to the column, but this liquefied nitrogen would not be of as high a purity as the shelf nitrogen formed in the high pressure column at 28. The high purity shelf nitrogen cannot be indiscriminately withdrawn because it is needed as reflux liquid in the low pressure column. By this invention such high purity shelf nitrogen is made available, the reflux liquid being provided, as is the required refrigeration, by liquefying a withdrawn nitrogen gas component. Similarly, as explained hereafter, a high purity oxygen can be withdrawn from the rectification zone as a liquid product stream.

Although the invention will now be described in detail with respect to separation of air, it is to be understood that it is equally applicable to separating other low-boiling mixtures such as nitrogen from natural gas, and nitrogen from carbon monoxide such as occurs in producing synthesis gas.

Referring now to FIG. 1, the air feed stream is cooled and partially liquefied in the conventional high-pressure Heylandt manner, which is well understood by those skilled in the air separation art. That is, the air feed stream is provided at a high pressure such as 2,000 p.s.i.g. to conduit 10, partially cooled by waste nitrogen effluent to about 0° C. in precooler 11 for freezing out of the contained moisture, and further cooled in forecooler 12 by heat exchange with an externally supplied refrigerant such as liquid ammonia, to a temperature of about −40° C. The liquid ammonia refrigerant may be introduced to forecooler 12 through inlet conduit 13 and the resulting ammonia vapor withdrawn through conduit 14. The forecooled high pressure air in conduit 10 is then divided into two parts: approximately one-half is diverted through branch conduit 15 and expanded to about 75 p.s.i.g. through work expander 16 with the production of external work. The aforementioned stream is simultaneously cooled while being work expanded, and the resulting cold air is discharged into the base of scrubber 17. Meanwhile, the undiverted part of the forecooled air in conduit 10 is consecutively directed through warm leg 18 and cold leg 19 for further countercurrent cooling against the nitrogen effluent in the shell side of these heat exchangers. The further cooled undiverted air discharged from the cold leg into conduit 10 is then throttled through valve 20 to about 75 p.s.i.g. so as to partially liquefy the stream. The latter is then introduced into the base of scrubber 17.

The feed air stream contains a substantial quantity of impurities such as moisture and carbon dioxide and a portion of such impurities are not removed in the previously described heat exchange system. Consequently, scrubber 17 is provided to remove these residual impurities so as to avoid clogging the liquid-gas contact means, for example, sieve-type trays. To this end, the cold gaseous air is passed through suitable liquid-gas contact means such as trays 21 to obtain the scrubbing action. The unliquefied but cleaned gaseous air emerges from scrubber 17 through conduit 22 and is passed into the base of the upper or higher pressure stage 23 of rectification zone 24 for partial condensation therein.

The rectifying column or zone 24 may be of the customary type in which the lower pressure stage 25 is mounted above the higher pressure stage 23 and a condenser-reboiler 26 receiving vapors from stage 23 is disposed within a chamber 27 at the base of the lower pressure stage 25 so that the condenser-reboiler 26 is cooled by liquid oxygen collected in chamber 26 for reboiling a portion of the oxygen to produce vapors for operation of lower pressure stage 25, and to effect liquefaction of substantially pure nitrogen vapor which provides reflux for the higher pressure stage 23 and which produces liquid nitrogen collected on a shelf 28 to be partially transferred by conduit 29 to the upper or colder end of lower pressure stage 25. Both higher pressure stage 23 and lower pressure stage 25 contain suitable liquid-gas contact means such as sieve-type trays 30.

Oxygen-enriched liquid accumulates in the base or warmer end of higher pressure stage 23, is withdrawn through conduit 31, and throttled in valve 32 to lower stage pressure. The throttled oxygen-enriched liquid is then introduced to lower pressure stage 25 at an intermediate level as reflux liquid. Meanwhile, the impurity-containing scrubber liquid is withdrawn from scrubber 17 through conduit 33 and directed through inlet valves 34 to either of two filters 35 piped in parallel. The low boiling impurities are removed therein and the impurity-free liquid is discharged through valves 36 to conduit 37 for juncture with the oxygen-enriched liquid in conduit 31, and passage to lower pressure stage 25 as reflux liquid. Part of the nitrogen-rich liquid accumulating on shelf 28 at the top or colder end of higher pressure stage 23 is withdrawn through conduit 29, subcooled in heat exchanger 38 by heat exchange with waste nitrogen, and one part of the subcooled shelf nitrogen is throttled through valve 39 for introduction to the top or cold end of lower pressure rectification stage 25 as reflux liquid. The nitrogen-rich gas reaching the cold end of lower pressure stage 25 is discharged therefrom through conduit 40 as the waste nitrogen effluent stream. The latter is first superheated in heat exchanger 38 against the nitrogen-rich shelf liquid being subcooled, and then consecutively passed through cold leg 19, warm leg 18, and precooler 11 for recovery of refrigeration to cool the air feed stream. The waste nitrogen is finally discharged from the heat exchange system at substantially ambient temperature.

The oxygen-rich liquid reaching the warmer or lower end of lower pressure rectification stage 25 accumulates on the reboiler side of condenser-reboiler 26, and a portion thereof is withdrawn through conduit 41 and control valve 42 as a product fraction.

Referring now to the novel aspects of this process, a portion of the clean waste nitrogen of about 98.5% purity is discharged from the warm end of precooler 11 at substantially ambient temperature and diverted from conduit 40 through branch conduit 43 and passed to the liquefier 44, indicated in block form but to be described below in detail. The clean nitrogen gas is liquefied therein and at least partly returned through conduit 45 to the cold end of lower pressure stage 25 as reflux liquid. If desired, another portion of liquefied nitrogen may be diverted from conduit 45 through branch conduit 45a and control valve 45b for other uses, such as refrigeration for the condenser-reboiler of an oxygen gas producing plant. This alternate reflux supply permits a corresponding thermally equivalent quantity of higher purity liquid nitrogen, e.g., 99.99%, to be withdrawn from the shelf 28 of higher pressure rectification stage 23. That is, liquid is directed through conduit 29, heat exchanger 38 for subcooling therein, and a product fraction is separated from the reflux liquid by flow through branch conduit 46 and control valve 46a therein.

If desired, the liquid nitrogen product fraction may be throttled through valve 46a from the higher pressure rectification stage level of about 90 p.s.i.g. to storage tank pressure of 0–10 p.s.i.g. This pressure reduction produces losses through flashing of the product nitrogen to gas, and the flashing gas can be partially recovered by first passing the throttled liquid-gas mixture through branch conduit 47 and control valve 47a to flashpot 48 at about 10 p.s.i.g., the pressure level of lower pressure rectification stage 25. The flash vapor is then vented from flashpot 48 through conduit 49 into the waste nitrogen conduit 40 for recovery of the former's refrigeration value. The liquid is withdrawn from flashpot 48 through conduit 50 having control valve 51 therein.

The FIG. 1 embodiment is readily adaptable to maintaining a high degree of argon recovery even though liquid nitrogen is withdrawn along with liquid oxygen as a product fraction. Normally, the argon recovery percentage is appreciably reduced when liquid nitrogen product is withdrawn from a conventional Heylandt-type refrigerated, liquid oxygen producing plant. This is due to the fact that the withdrawn liquid nitrogen product is made unavailable for lower pressure rectification stage refluxing purposes, and a substantial amount of the argon is lost in the waste nitrogen effluent from the cold end of such stage. However, the present invention replaces the reflux lost as liquid product by another nitrogen-rich liquid stream, and thus permits the continuation of a high argon recovery level in spite of the liquid nitrogen product. To this end, an argon-containing vapor fraction may be withdrawn from an intermediate thermal level of lower pressure rectification stage 25 through conduit 52 and control valve 53 for concentration of the argon, for example, as disclosed in U.S. Patent No. 2,547,177 to G. E. Simpson.

Figure 2:
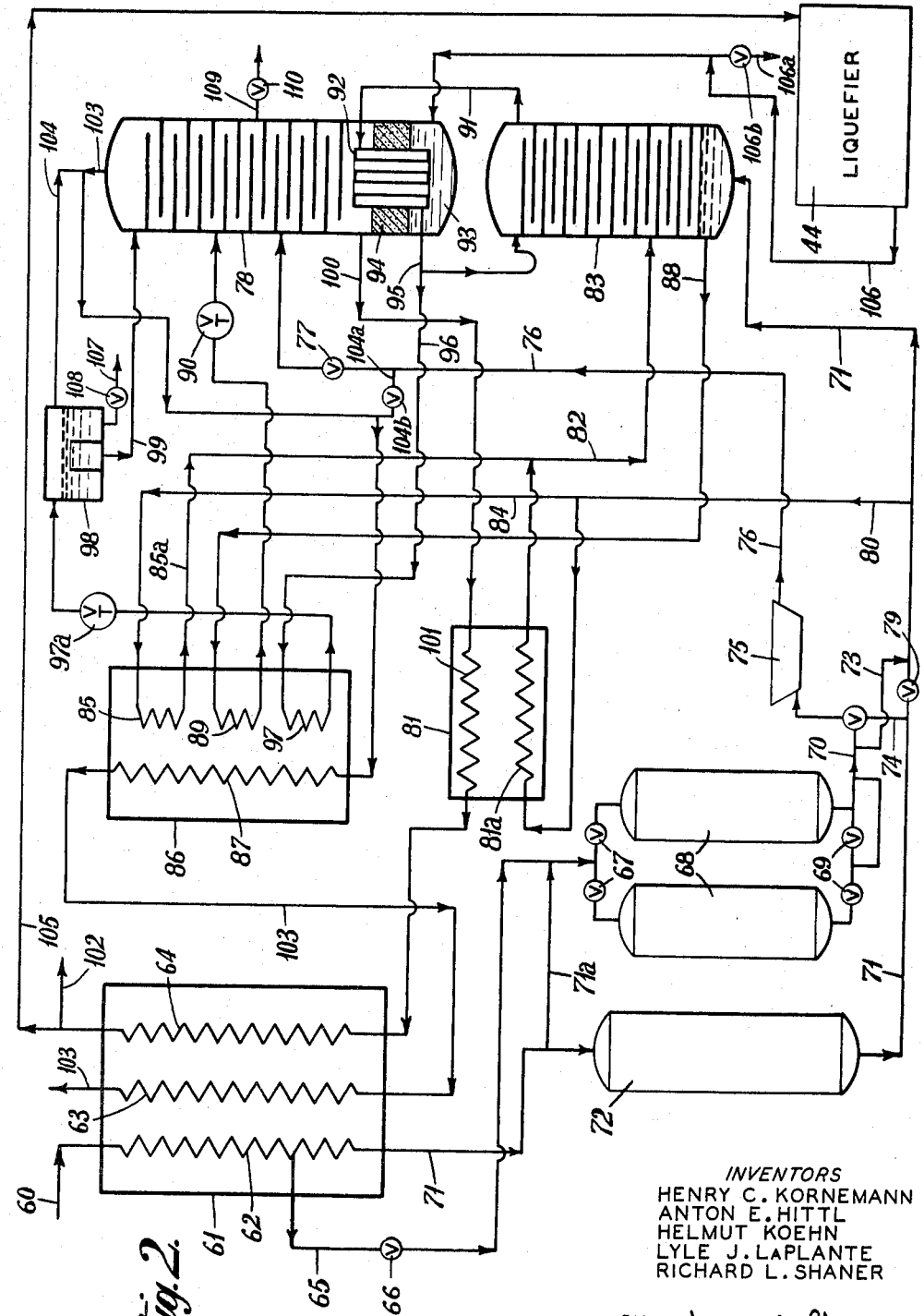
FIG. 2 shows a flow diagram of a process similar to that of FIG. 1 but modified so that the feed stream is supplied at a relatively low pressure.

FIG. 2 illustrates another embodiment of the invention wherein the feed air is processed at a relatively low pressure, and gaseous not liquid oxygen is withdrawn from the rectification zone. The inlet air may be processed in the conventional Linde-Frankl manner as is well understood by those skilled in the art. The inlet air is introduced through feed conduit 60 at a pressure of, for example, 75 p.s.i.g. and directed to reversible heat exchange zone 61 for cooling and partial cleaning therein. Zone 61 may comprise cold accumulators wherein the air is cooled through an intermediate refrigeration storage means such as regenerative packing as is well known to those skilled in the art and described in U.S. Patent No. 1,890,646 to M. Frankl. Alternatively, reversible heat exchange zone 61 may comprise passage exchanging heat exchangers wherein the air stream is cooled by a colder fluid in an adjacent passageway as described more fully in U.S. Patent No. 2,460,859 to P. R. Trumpler. The reversible heat exchange zone 61 is illustrated as comprising a passage exchanging heat exchanger with reversing passageways 62 and 63, and non-reversing passageway 64. The inlet air is cooled and partially cleaned in reversing passageway 62 by heat exchange with waste nitrogen gas flowing countercurrently in thermally associated reversing passageway 63 and product oxygen gas in nonreversing passageway 64. It is to be noted that the air and nitrogen flows are periodically switched between the reversing passageways, so that the nitrogen also serves to remove the previously deposited water and carbon dioxide impurities. Reversing valves (not shown) are suitably connected to each other and to zone 61 in order to achieve this cyclic heat exchange which will be fully understood by those skilled in the art.

A partially cooled portion of the air feed stream is withdrawn from the reversible heat exchange zone 61 through conduit 65 and control valve 66 therein at about the −100° C. level, so as maintain such zone in the self-cleaning condition. Such diverted or "side-bleed" stream is cleaned of carbon dioxide by passage through inlet valves 67 to either of adsorption traps 68, piped in parallel. The resulting carbon dioxide depleted side-bleed stream is discharged through either of valves 69 to conduit 70. Meawnhile, the undiverted part of the air stream in zone 61 is further cooled therein to at least −170° C., thereby depositing most of its carbon dioxide content in the reversing passageway. The further cooled air is discharged from the reversible heat exchange zone into conduit 71 and directed through cold end adsorption trap 72 for removal of residual carbon dioxide. A portion of the further cooled air is preferably diverted from conduit 71 through branch conduit 71a to the partially cooled portion of the air feed stream in conduit 65, so as to cool the latter.

The FIG. 2 embodiment is a self-sustaining cycle in that the necessary low temperature refrigeration to operate the rectification zone is obtained by work expansion of a portion of the cooled air feed stream. To this end, the temperature and quantity of the side-bleed air is adjusted for work expansion by first diverting a part of the relatively warm and cleaned side bleed through conduit 73 to the further cooled and cleaned air stream in conduit 71. Next, a portion of the latter is diverted through conduit 74 to the undiverted side-bleed stream in conduit 70, and the resulting mixture forms the work expander inlet stream at a temperature of about −155° C. This stream is then expanded through turbine 75 to a low pressure, and simultaneously cooled. The resulting cold air is discharged into conduit 76 and at least part thereof is passed through control valve 77 to lower pressure rectification stage 78 for separation therein.

The undiverted, further cooled air in conduit 71 is passed through control valve 79 downstream of branch conduit 74. A second part thereof is diverted through conduit 80, and further divided into two portions. One portion passes through heat exchanger 81 and passageway 81a therein in countercurrent heat exchange with an oxygen gas stream being superheated thereby, the cold air being at least partially liquefied in the heat exchanger and directed through conduit 82 to higher pressure rectification stage 83 for partial separation therein. The second portion of the second diverted part of the further cooled air is itself diverted from conduit 80 through branch conduit 84 to passageway 85 of heat exchanger 86 for at least partial liquefaction by countercurrent heat exchange with effluent nitrogen or work expanded air in passageway 87. The partially liquefied second portion in conduit 85a is reunited with the partially liquefied first portion in conduit 82 for passage to higher pressure rectification stage 83 as previously described.

The undiverted part of the further cooled air in conduit 71 is introduced to the lower or warmer end of higher pressure rectification stage 83 for partial separation therein. Oxygen-enriched liquid accumulating in the warmer end of this stage is withdrawn through conduit 88, subcooled by flow through passageway 89 in heat exchanger 86, and introduced as reflux liquid at an intermediate level of lower pressure rectification stage 78 after throttling through valve 90.

It will be noted that in the FIG. 2 embodiment, higher and lower pressure rectification stages 83 and 78, respectively, may be physically although not functionally separated. Nitrogen-rich vapor reaching the top or colder end of higher pressure rectification stage 83 is withdrawn through conduit 91 and passed to heat exchanger 92 in the base of lower pressure rectification stage 78. The nitrogen-rich vapor is condensed in heat exchanger 92 by the surrounding bath of liquid oxygen in chamber 93. A portion of the liquid oxygen is reboiled in chamber 93, and the resulting vapor rises while the liquid is recirculated through adsorbent section 94 for removal of low-boiling air impurities. The cleaned oxygen vapor then rises through the lower pressure rectification stage 78 in the conventional manner, and the condensed nitrogen-rich liquid is withdrawn from heat exchanger 92 through conduit 95 for division into two parts: One part is returned through conduit 95 to the top or colder end of higher pressure stage 83 as reflux liquid, and the other part is directed through branch conduit 96 to passageway 97 for subcooling in heat exchanger 86. The subcooled nitrogen-rich liquid is throttled through valve 97a and then may be directed to container 98 from whence it is withdrawn and introduced through conduit 99 to the top or colder end of lower pressure rectification stage 78 as reflux liquid.

Returning now to the lower pressure rectification stage 78, gaseous oxygen is withdrawn from the lower end thereof through conduit 100 to passageway 101 of heat exchanger 81 for superheating therein against cold air. The partially warmed oxygen is then directed to non-reversing passageway 64 in reversible heat exchange zone 61 for recovery of the balance of its refrigeration by the feed air in either of reversing passageways 62 and 63. A portion of the warmed, impurity-free oxygen emerging from the warm end of zone 61 is discharged through conduit 102 as a product fraction.

The nitrogen effluent reaching the top or colder end of lower pressure stage 78 is withdrawn through conduit 103, and along with nitrogen vapor from container 98 in conduit 104 directed to passageway 87 of heat exchanger 86 for superheating therein in the previously described manner. A portion of the work expanded air in conduit 76 may be diverted therefrom through branch conduit 104a and control valve 104b for mixing with the cold nitrogen in conduit 103, upstream of heat exchanger 86. The partially warmed composite stream of nitrogen effluent and/or work expanded air is further warmed to substantially ambient temperature by flow through reversing passageway 63 in reversible heat exchange zone 61, and simultaneously removes the air impurities previously deposited in such passageway. The impurity-containing waste nitrogen is discharged from the warm end of zone 61 in conduit 103.

In the FIG. 2 embodiment, warmed high purity oxygen gas separated in the rectification zone is diverted from conduit 102 at the warm end of reversible heat exchange zone 61 to branch conduit 105 for passage to the liquefier 44, again illustrated in block form. The oxygen gas is liquefied therein and withdrawn therefrom through conduit 106, liquid oxygen product being withdrawn through conduit 106a, and control valve 106b therein. At least part of the liquid oxygen is returned to chamber 93 in the base of lower pressure rectification stage 78, where it is reboiled by heat exchange with the condensing nitrogen-rich liquid in heat exchanger 92. Vapor from the reboiling liquid oxygen then rises while the liquid is recirculated through adsorption section 94, and is processed in the previously described manner. The adsorption section 94 may be a silica gel adsorption bed which removes impurities in the liquid oxygen. The liquid from heat exchanger 92 flows downward through the bed and is boiled again by rising through the passages of reboiler 92. This refrigeration supply permits a thermally equivalent quantity of subcooled liquid nitrogen to be withdrawn from container 98 through conduit 107 and control valve 108 as a product fraction. The purity of the liquid nitrogen product is determined by the reflux ratio within the column 83, and a wide range is possible. In the usual case when 99.5% purity oxygen gas is produced, the liquid nitrogen product purity may be as high as 99.999%. An argon-containing vapor stream may be withdrawn from an intermediate level of lower pressure rectification stage 78 through conduit 109 and control valve 110 therein for further purification.

Figure 3:
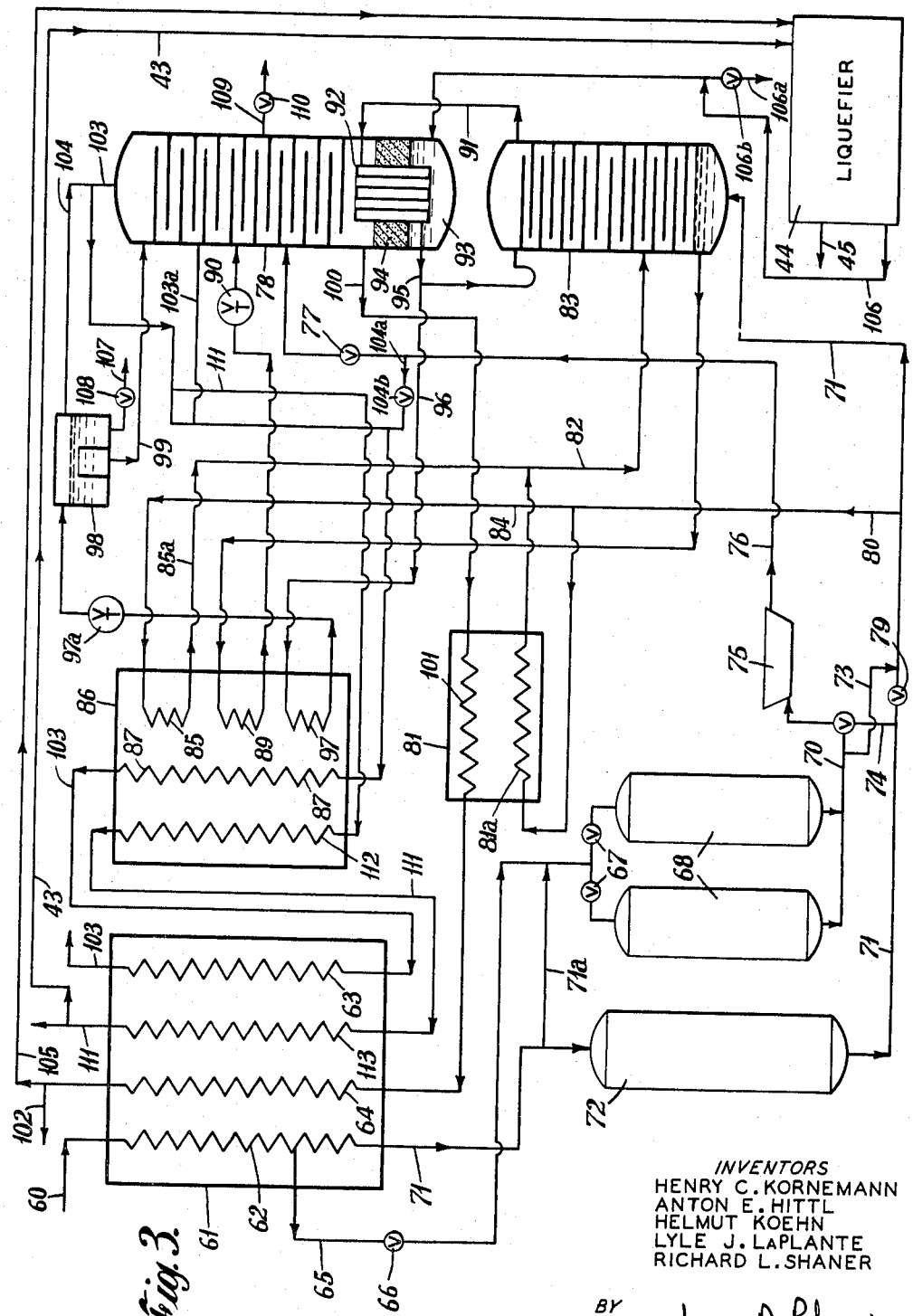
FIG. 3 shows a flow diagram of a process similar to that of FIG. 2, but modified so that two gas mixture components may be liquefied.

The present invention may also be employed to produce variable quantities of gaseous oxygen, liquid oxygen, gaseous nitrogen and liquid nitrogen as illustrated in FIG. 3. This embodiment is similar to that of FIG. 2, and corresponding items have been given the same reference number in the interest of simplicity. The differences between these two cycles will now be described in detail: The nitrogen effluent stream from lower pressure rectification stage 78 is again withdrawn from the colder end of such stage through conduit 103, and divided into two parts. One part is super-heated in passageway 87 of heat exchanger 86, and further warmed in reversing passageway 63 where it removes the previously deposited air impurities. This part is finally discharged from the warm end of reversible heat exchange zone 61 in conduit 103 as waste nitrogen. The second part of the cold nitrogen effluent is diverted from conduit 103 through branch conduit 111, superheated in heat exchanger 86 by flow through passageway 112 therein, and further warmed in non-reversing passageway 113 of zone 61 to substantially ambient temperature. Alternately, the first part of the cold nitrogen effluent may be composed of lower purity waste nitrogen withdrawn through conduit 103a from a point below the top of low pressure column 78. It will thus be apparent that the FIG. 3 reversible heat exchange zone 61 contains two reversing passageways 62 and 63, and two non-reversing passageways 64 and 113. The latter is thermally associated with the reversing passageways, but the nitrogen flowing therethrough does not contact the air impurities. For this reason, the warmed nitrogen gas emerging from non-reversing passageway 113 into conduit 111 is impurity-free, and a portion thereof is discharged as product nitrogen gas. Another portion of impurity-free nitrogen gas may be diverted through conduit 43 to liquefier 44. The resulting liquid nitrogen product is withdrawn from liquefier 44 through conduit 45. Alternatively this nitrogen gas may be passed to a second liquefier if desired. Also, part of the liquid nitrogen produced in the liquefier may be returned to the upper end of the low pressure rectification zone as reflux liquid. In exchange for the liquid nitrogen returned, additional high purity liquid nitrogen may be withdrawn from the upper end of the high pressure rectification zone 83. As a further alternative, instead of withdrawing additional high purity nitrogen, liquid oxygen may be withdrawn from the reboiler chamber 93. One advantage of withdrawing liquid oxygen from the low pressure rectification column 25 instead of from the liquefier as in FIG. 2 is that the oxygen purity may be slightly higher.

It will be recalled that the FIGS. 2 and 3 embodiments were both described as including the recovery of low-temperature refrigeration by work expanding a further cooled air stream. The present invention is equally suitable for a system wherein sufficient liquefied air component is returned to the lower pressure rectification stage to satisfy the plant's low temperature refrigeration requirements for rectification purposes and the like. For example, sufficient additional liquid oxygen may be returned from liquefier 44 through conduit 106 to chamber 93 to balance the low temperature refrigeration formerly provided by expansion turbine 75, thereby eliminating the need for the latter.

Figure 4:
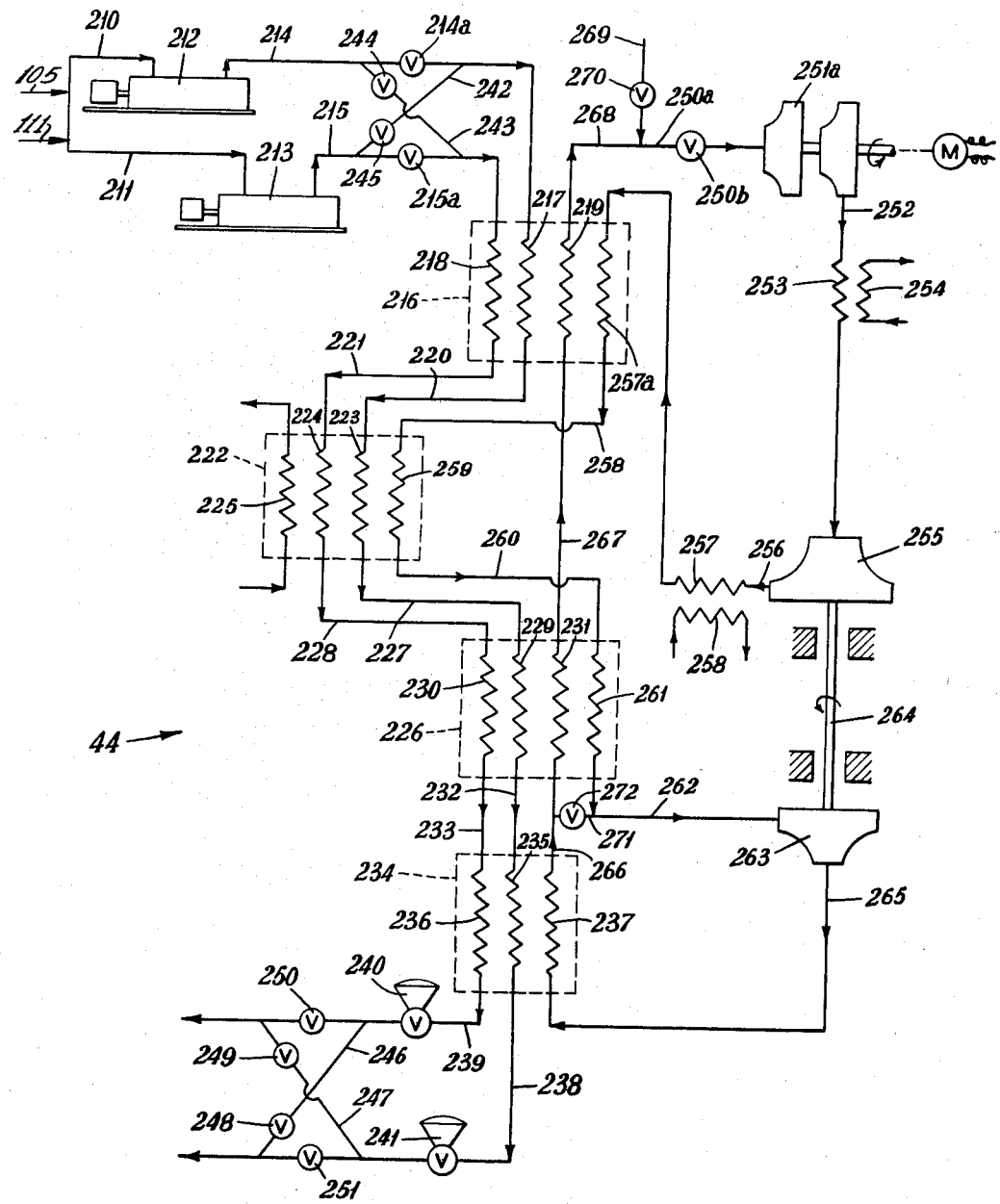
FIG. 4 shows a flow diagram of an exemplary process for cooling and liquefying gas mixture components, which process is uniquely suitable for use in combination with the processes of FIGS. 1 through 3.

FIG. 4 illustrates a novel system for cooling and liquefying gas mixture components, which system is uniquely suited for use as the liquefying step of the present invention (item 44 of FIGS. 1–3). The combination of this particular liquefying cycle with the previously described features provides a process for separating a gas mixture which is substantially more efficient and economical than previously proposed systems for adding product flexibility to an existing liquid or gas producing plant. It is to be understood, however, that the invention is not limited to this particular method of cooling and liquefying gases, but that any workable method of liquefying, for example, oxygen and nitrogen, may be employed. The FIG. 4 liquefier cycle itself does not constitute part of the present invention but is claimed in concurrently filed application Serial No. 32,974 in the name of H. Koehn et al.

Referring now more specifically to FIG. 4, two completely separate feed gas circuits are illustrated, so that for example, oxygen and nitrogen streams may be separately processed and liquefied. If only one feed gas component is to be processed, a portion of the flow may be handled in each circuit, or alternatively, only one circuit may be employed. The cycle will be initially described in terms of oxygen feed gas passing through both circuits. The oxygen feed gas, supplied to conduits 210 and 211 (corresponding to conduit 105 of FIGS. 2 and 3) is compressed to at least 80 p.s.i.g., and preferably about 150 p.s.i.g. in compressors 212 and 213, respectively. The compressed oxygen feed gas is then passed through conduits 214 and 215 to aftercoolers (not shown), and next through respective shutoff valves 214a and 215a to warm leg heat exchanger 216 as a first cooling step to about −46° C. The feed gas flows through passageways 217 and 218, and is cooled by counter-currently flowing refrigerant gas in passageway 219.

The partially cooled oxygen feed gas is discharged from warm leg heat exchanger 216 into conduits 220 and 221 and cooled therein to about −60° C. That is, the partially cooled oxygen feed gas in conduits 220 and 221 is directed to passageways 223 and 224, respectively, in forecooler 222, and countercurrently cooled by an externally supplied refrigerant, preferably disclorodifluoromethane or alternatively monochlorodifluoromethane or ammonia, flowing through passageway 225. It is to be understood that the externally refrigerated forecooling step is preferred but is not essential to the present invention, and that the necessary cooling may alternatively be effected in warm leg heat exchanger 216 and cold leg heat exchanger 226.

The forecooled oxygen feed gas is discharged from forecooler 222 into conduits 227 and 228, hence to cold leg heat exchanger 226 for further cooling in passageways 229 and 230, respectively, by heat exchanging with the counter-currently flowing refrigerant in conduit 231. The further cooled oxygen gas is discharged from cold leg heat exchanger 226 at a temperature of about −140° C. into conduits 232 and 233, and directed to liquefier 234 for flow through communicating passageways 235 and 236, respectively, and liquefaction by countercurrently flowing gaseous refrigerant in passageway 237. In liquefier 234, the oxygen feed stream is cooled to saturation, totally condensed and the product liquid preferably subcooled to a temperature of about −186° C. It is withdrawn as a pressurized liquid product through conduits 238 and 239 (corresponding to conduit 106 in FIGS. 2 and 3) and passed through control valves 240 and 241, respectively, to storage means and the lower pressure rectification stage in any required proportions. One reason for subcooling the liquid product is to avoid flashoff on expansion to a storage tank preferably at a pressure of 0–15 p.s.i.g. However, the liquid product may also be stored at substantially the feed stream pressure if desired.

If it is necessary to transfer either warmed compressed feed gas or subcooled product liquid from one circuit to the other for any purpose such as to control the proportion of total feed gas handled in each passage, appropriate interconnections and valving means may be provided. For example, interconnecting conduits 242 and 243 with shutoff valves 244 and 245, respectively, may be provided at the warm end of the heat exchange system. Also, interconnecting conduits 246 and 247 with shutoff valves 248 and 249, respectively, plus shutoff valves 250 and 251 may be provided at the cold end of such system.

All control of the two feed stream pressures is effected at the cold end of the liquefier by automatic control valves 240 and 241. All other valves in both the warm and cold ends, such as 244, 245, 248, 249, 250, 251, are used for flow balancing or shutoff purposes to divert the flow wherever desired, such as into a particular storage tank or other further usage. It is to be understood, however, that the control aspects of the liquefier do not constitute part of the present invention.

Referring now to the closed refrigeration circuit, either nitrogen or air may be employed as the refrigerating medium, and the circuit will be specifically described in terms of nitrogen although air is also suitable. For liquefying feed streams besides oxygen or nitrogen, other refrigerant gases having suitable physical properties would be used. The refrigerant gas may be of the perfect gas type, not relying upon special nonideal properties to provide refrigeration at certain temperature levels by Joule-Thomson throttling. Clean dry nitrogen may for example, be supplied at about 8 p.s.i.g. and 15° C. in conduit 250a with control device 250b therein, which may be either a valve or the inlet guide vanes within the centrifugal compressor 251a. The nitrogen gas is pressurized in compressor 251a, preferably of the centrifugal type, to a pressure of at least 50 p.s.i.g. and preferably about 100 p.s.i.g. The compressed nitrogen refrigerant gas is discharged into conduit 252 and aftercooled in passageway 253 to a temperature below about 40° C. by heat exchange with a suitable fluid such as water in thermally associated passageway 254. The aftercooled nitrogen gas is then further compressed in the turbine loading booster compressor 255 to a pressure of at least 80 p.s.i.g. and preferably about 145 p.s.i.g., and discharged therefrom into conduit 256. The further compressed nitrogen gas is then aftercooled in passageway 257 again to a temperature below about 40° C. by heat exchange with an appropriate fluid such as water in thermally associated passageway 258.

The further compressed, aftercooled nitrogen is first directed to the warm end of warm leg heat exchanger 216 for cooling therein to about −46° C. by flow through passageway 257a in countercurrent heat exchange relation with the refrigerant in passageway 219. The partially cooled, compressed nitrogen gas is then directed through conduit 258 to passageway 259 in forecooler 222 for further cooling therein to about −60° C. However, as previously discussed, the forecooling step is not essential to this invention. The forecooled compressed nitrogen is then discharged into passageway 260 and directed to the warm end of cold leg heat exchanger 226 for flow through passageway 261 in countercurrent heat exchange relation with the refrigerant in passageway 231.

The compressed nitrogen gas is cooled in cold leg 226 to a temperature of about −141° C., and discharged into conduit 262 for flow to a work expander such as turbine 263. At this point, the nitrogen is expanded to a low pressure preferably in the range of 6–10 p.s.i.g., although the discharge may be at subatmospheric pressure, if desired, to lower the condensing temperatures. However, liquefaction of the refrigerant gas is purposely avoided to prevent reduced efficiency and possible erosion of the expander parts due to its handling mixed flow, and to avoid processing two phase flow in the heat exchangers with the resulting entrainment separators, liquid levels, and the like. The nitrogen gas is cooled to about −187° C. by virtue of such work expansion, and the power developed in the expansion turbine is preferably transferred directly to the highest pressure level of the refrigerant compression step. This is preferably accomplished by employing shaft 264 to connect turbine 263 with booster compressor 255, to provide highly efficient transfer of the available power. High shaft speeds which permit the most efficient and economic design of the turbine, can be most effectively utilized to absorb the power by centrifugally compressing an equivalent mass of low volume gas stream at higher pressures and smaller volumes, rather than compressing a large volume gas stream at lower pressure, such as occurs in the first stage of compression. However, the turbine 263 and booster compressor may be entirely separated if desired. In this event, the turbine power may be absorbed by an electric generator and the booster compressor driven by an electric motor.

The work expanded nitrogen is discharged from turbine 263 into conduit 265, and passed from the cold end to the warm end of the feed gas heat exchange system to refrigerate the latter. More specifically the work expanded nitrogen is first passed to the cold end of liquefier 234 for flow through passageway 237, thereby desuperheating, condensing and preferably subcooling the product oxygen stream in thermally associated passageways 235 and 236. The nitrogen is simultaneously warmed to about —156° C. and thereafter directed through connecting conduit 266 to passageway 231 of cold leg heat exchanger 226 for further cooling of the partially cooled oxygen feed streams. Finally, the partially rewarmed nitrogen refrigerant gas is directed through communicating conduit 267 to warm leg heat exchanger 216 and passage 219 therein for warming to near ambient temperature.

The resulting warmed nitrogen refrigerant gas is discharged from the heat exchange system through conduit 268, and recirculated to connecting conduit 250a for return to the inlet side of compressor 251a. Makeup nitrogen gas from a suitable source is admitted to conduit 250a through conduit 269 and control valve 270 therein to overcome system losses through compressor seals, and the like. A convenient source of such gas is the colder or upper end of the lower pressure rectification stage, although gas from the colder or upper end of the higher pressure rectification stage may also be used if desired.

The basic FIG. 4 system may be employed to liquefy nitrogen instead of oxygen feed gas. It is to be noted that because of the difference in the normal boiling points of oxygen and nitrogen, it is necessary to compress nitrogen to a higher pressure than oxygen to obtain the same cycle efficiencies. As explained previously, the feed gas stream must always be provided at sufficient pressure for liquefaction by the lowest temperature level attained by the refrigerant stream.

If both oxygen and nitrogen feed gas liquefaction is desired as in the FIG. 3 embodiment, another passageway may be employed in the warm and cold leg heat exchanger 216 and 226, and forecooler 222, or each feed gas constituent may be directed through one of the existing, illustrated circuits.

For a particular refrigerant and feed gas, optimum performance is obtained by carefully selecting the feed gas pressure which in combination with the refrigerant gas pressure and recirculation rate will provide small temperature differences within the heat exchangers and also permit making maximum use of external forecooling if used. The effect of increasing the condensing pressure of the feed gas stream is to reduce its latent heat and increase the degree of sub-cooling required. Thus, the feed gas pressure is selected to maintain optimum economy between the latent heat and sub-cooling requirements for providing a liquid stream preferably at essentially ambient pressure, as will be understood by those skilled in the art.

It has been found that a temperature pinch occurs in the liquefier heat exchanger 234 at the point where condensation begins. That is, the temperature of the product feed stream being cooled is reduced at that point to very nearly the temperature of the expanded recycle stream flowing countercurrently therethrough. If the refrigerant recirculation ratio is reduced to about 7.2 c.f.h. (NTP) nitrogen circulated per 1 c.f.h. (NTP) oxygen liquefied, using external forecooling to —60° C., this temperature pinch becomes so severe as to limit the utilization of any additional refrigeration from the forecooler. However, optimum performance (with forecooling to —60° C.) is obtained with a recirculation ratio of about 8.5 c.f.h. (NTP) nitrogen recirculated per 1 c.f.h. (NTP) oxygen liquefied and subcooled. This ratio opens the temperature difference at the pinch point to about 6° C., and also opens the temperature difference at the warm end of liquefier 234 to about 16° C. to achieve highly efficient liquefier operation. While a recirculation ratio greater than 8.5 may be used, it results in more refrigeration being made available at the lowest temperature level than can be effectively utilized. This causes increased temperature differences within the various heat exchangers and also permits less external forecooling to be used, thus causing reduced overall cycle efficiency.

During the startup and cooldown phase of the liquefier operation, a condition will arise whereby the power developed by work expander 263 will exceed that which can be absorbed in booster compressor 255, resulting in overspeeding of the unit. The preferred control method utilizes bypass conduit 271 containing control valve 272, whereby a sufficient quantity of gas may be diverted from conduit 262 to conduit 266 to maintain the desired energy balance between work expander 263 and booster compressor 255. This bypass line and valve may be optionally installed at the warm end between conduits 256 and 268. However, if expander 263 is loaded by an electric generator to maintain essentially constant speed, this bypass line is not required.

Precise process control is necessary for the FIG. 4 liquefier to obtain optimum performance, and is preferably maintained automatically. The refrigeration capacity is controlled between 60–100% of rated load by varying the refrigerant recirculation rate in the closed system with control device 250b to the base compressor 251a. To maintain high cycle efficiency at reduced loads, the booster compressor discharge pressure is preferably maintained at rated pressure, e.g., 145 p.s.i.g., by variable area inlet nozzles in the expansion turbine 255, in response to a pressure signal from conduit 256 near the inlet of warm leg heat exchanger 216. Also, the expander exhaust pressure is controlled by gas makeup valve 270. This control method maintains essentially constant enthalpy change across the turbine and makes the liquefier capacity essentially proportional to the refrigerant recirculation rate. Also, the turbine inlet and exhaust temperature are maintained by control valves 240 and 241, which control the level of the condensing feed stream within liquefier heat exchanger 234. The feed gas pressure is maintained at a predetermined optimum level by a capacity control system (not shown) on compressors 212 and 213. If used, the forecooler system is preferably operated to provide the lowest possible temperature in conduits 227, 228 and 260, but may also be operated to provide a predetermined temperature therein, e.g., —60° C.

It is apparent from the foregoing description that the present invention provides a novel integrated process for separating low-boiling mixtures such as air, wherein nitrogen and oxygen may be recovered in a highly efficient manner and in widely varying proportions of either or both the liquid and gaseous state. For example, if an oxygen gas producing plant having excess rectification capacity is available, a liquefier may be employed in accordance with this invention to effectively utilize the excess capacity to produce a liquid product. Also, a liquefier operating with a gas producing plant usually places liquid production facilities closer to the point of consumption than a centralized, basically liquid producing plant would be located. This reduces distribution losses of the product as well as transportation equipment and expense.

Another advantage of this invention over the prior art is that a basically oxygen gas producing plant can be employed to produce liquid products in virtually any desired quantity while retaining the inherently higher separating efficiency of gas plant cycles. Furthermore, the present liquefier-gas plant combination requires less investment for equivalent liquid production than the prior art liquid producing cycles. Compared to the conventional liquid producing cycle using high pressure compressors and dual high pressure heat exchangers, the instant process uses low pressure rotary compressors and reversing heat transfer units for air cleanup. Thus, the equipment is quite compact in physical size, more reliable in operation, and may be easily controlled automatically. Also, plant operation is safer, since with low pressure rotary compressors there is no hydrocarbon contamination or plugging of low temperature equipment with compressor lubricants.

Still another advantage of the invention is that larger quantities of liquid products may be produced without upsetting the optimum reflux ratios within either the high pressure or low pressure columns. Such undesirable change in reflux ratios occurs if the products are withdrawn without replacing a thermally equivalent stream. In the FIG. 1 embodiment, the liquid exchange arrangement permits the recovery of truly by-product high purity liquid nitrogen. If the high purity nitrogen were withdrawn from the top of the high pressure column as a liquid or as a gas and liquefied in a separate step, the low pressure column would be deficient in reflux liquid and the recovery of liquid oxygen correspondingly reduced due to more oxygen escaping in the effluent stream. Likewise, in the FIGS. 2 and 3 embodiments, exchanging the thermally equivalent streams permits the production of the desired liquid and gas products in wide proportions while maintaining substantially optimum reflux ratios in each column.

Although preferred embodiments of the invention have been described in detail, it is contemplated that modifications of the process may be made and that some features may be employed without others, all within the spirit thereof as set forth herein.

What is claimed is:

1. A process for the separation of a gas mixture by low temperature rectification into lower and higher boiling components comprising providing a pressurized gas mixture feed stream, cooling the feed stream, rectifying the cooled feed stream in a rectification zone having a high pressure stage and a low pressure stage for separating the gas mixture into components, withdrawing at least one separated gas phase component from said rectification zone, warming the withdrawn separated gas phase component by heat exchange with said feed stream, liquefying said separated gas phase component externally of said rectification zone, returning at least part of the so liquefied component to said rectification zone, and withdrawing at least one separated liquid phase component from the rectification zone for use as a product stream, the amount of gas phase component withdrawn, liquefied, and returned to the rectification zone being sufficient to restore the refrigeration removed in the withdrawn liquid phase product stream, in process irreversibilities, and in heat inleak.

2. A process for the separation of a gas mixture by low temperature rectification into lower and higher boiling components comprising providing a pressurized gas mixture feed stream, cooling the feed stream, work expanding a portion of said cooled feed stream to provide refrigeration, rectifying the cooled feed stream in a rectification zone having a high pressure stage and a low pressure stage for separating the gas mixture into components, withdrawing at least one separated gas phase component from said rectification zone, warming the withdrawn separated gas phase component by heat exchange with said feed stream, liquefying said separated gas phase component externally of said rectification zone, returning at least part of the so liquefied component to said rectification zone, and withdrawing at least one separated liquid phase component from the rectification zone for use as a product stream, the amount of gas phase component withdrawn, liquefied, and returned to the rectification zone being sufficient to restore, along with the work expansion step, the refrigeration removed in the withdrawn liquid phase product stream, in process irreversibilities, and in heat inleak.

3. A process for the separation of air by low temperature rectification into lower and higher boiling components comprising providing a pressurized air feed stream, cooling the feed stream, rectifying the cooled feed stream in a rectification zone having a high pressure stage and a low pressure stage for separation into air components, withdrawing at least one gas phase air component from said rectification zone, warming said withdrawn gas phase air component by heat exchange with said air feed stream, liquefying said gas phase air component externally of said rectification zone, returning at least part of the liquefied air component to said rectification zone, and withdrawing at least one liquid phase air component from the rectification zone for use as a product stream, the amount of gas phase component withdrawn, liquefied, and returned to the rectification zone being sufficient to restore the refrigeration removed in the withdrawn liquid phase product steam, in process irreversibilities, and in heat inleak.

4. A process according to claim 3 wherein gaseous nitrogen is the gas phase air component withdrawn from the rectification zone, and liquid nitrogen is the withdrawn liquid phase air component steam.

5. A process according to claim 3 wherein gaseous oxygen is the gas phase air component withdrawn from the rectification zone, and liquid nitrogen is the withdrawn liquid phase air component stream.

6. A process according to claim 3 wherein said rectification zone comprises a lower pressure and an upper pressure stage, gaseous oxygen is withdrawn from the lower pressure stage as said gas phase air component, and liquid oxygen is returned to said lower pressure stage as said liquefied air component.

7. A process according to claim 3 wherein said rectification zone comprises a lower and an upper pressure stage, gaseous nitrogen is withdrawn from the lower pressure stage as said gas phase air component, and liquid nitrogen is returned to the colder end of said lower pressure stage as said liquefied air component and as reflux liquid for said lower pressure stage.

8. A process according to claim 3 wherein said gas phase air component is liquefied in a close refrigeration circuit comprising the steps of compressing said gas phase air component to a pressure above 80 p.s.i.g., providing a refrigerant selected from the group consisting of nitrogen and air, and cooling and liquefying the compressed gas phase air component by heat exchange with said refrigerant.

9. A process according to claim 3 wherein said gas phase air component is liquefied in a closed refrigeration circuit comprising the steps of compressing said gas phase air component to a pressure above 80 p.s.i.g., providing a gaseous refrigerant selected from the group consisting of nitrogen and air, compressing said refrigerant to a pressure of at least 80 p.s.i.g., work expanding the compressed refrigerant to a low pressure thereby developing power, transferring the power developed in the work expansion step directly to the refrigerant compression step at the highest pressure level thereof, partially cooling the compressed gas phase air component in a first cooling step, further cooling such component in a second cooling step, liquefying the further cooled component, passing the still gaseous work expanded refrigerant consecutively through the liquefaction, further cooling and first cooling steps in countercurrent heat exchange with the compressed gas phase air component to effect such cooling and liquefaction thereof, withdrawing the warmed refrigerant from the warm end of the first cooling step and circulating such refrigerant to the refrigerant compression step.

10. A process according to claim 3 wherein said rectification zone comprises a lower pressure and an upper pressure stage being separated by a condenser-reboiler section, gaseous nitrogen having a medium purity of about 98.5% is withdrawn from the colder end of said lower pressure stage as said gas phase air component, liquid oxygen is withdrawn from the reboiler section as a product, and liquid nitrogen having a high purity of at least 99.9% is withdrawn from the colder end of said upper pressure stage as said liquid phase air component stream.

11. A process according to claim 3 wherein said rectification zone comprises a lower pressure and an upper pressure stage being separated by a condenser-reboiler section, gaseous oxygen is withdrawn from the warmer end of said lower pressure stage with one part thereof serving as said gas phase air component and the remaining part being discharged as a product, and liquid nitrogen having a purity of at least 99.9% is withdrawn from the colder end of said upper pressure stage as said liquid phase air component stream.

12. A process according to claim 3 wherein the gas phase air component is warmed to ambient temperature by said heat exchange with the air feed stream.

13. A process for the separation of air by low temperature rectification into lower and higher boiling components comprising providing a pressurized air feed stream, cooling the feed stream, work expanding a portion of said cooled feed stream to provide refrigeration, rectifying the cooled feed stream in a rectification zone having a high pressure stage and a low pressure stage for separation into air components, withdrawing at least one gas phase air component from said rectification zone, warming said withdrawn gas phase air component, by heat exchange with said air feed stream, liquefying said gas phase air component externally of said rectification zone, returning at least part of the liquefied air component to said rectification zone, and withdrawing at least one liquid phase air component from the rectification zone for use as a product stream, the amount of gas phase component withdrawn, liquefied, and returned to the rectification zone being sufficient to restore, along with the work expansion step, the refrigeration removed in the withdrawn liquid phase product stream in process irreversibilities, and in heat inleak.

14. Apparatus for the separation of a gas mixture by low temperature rectification comprising the combination of means for providing a pressurized gas mixture feed stream; heat exchange means for cooling such feed stream; a rectification column having a high pressure stage and a low pressure stage for separating the cooled feed stream gas into mixture components; means communicating with the rectification column for withdrawing a separated gas phase component from said rectification column; means for passing the withdrawn gas phase component to said heat exchange means for cooling said pressurized gas mixture feed stream, thereby warming said gas phase component; means external of the rectification column for liquefying the warmed gas phase component; means for returning at least part of the liquified component from the liquefying means to said rectification column; and means for withdrawing a liquid phase component stream from said rectification column for use as a product stream.

References Cited by the Examiner

UNITED STATES PATENTS

| | | | |
|---|---|---|---|
| 2,134,699 | 11/1938 | Brewster | 62—40 X |
| 2,496,380 | 2/1950 | Crawford | 62—13 |
| 2,526,996 | 10/1950 | Crawford | 62—13 X |
| 2,579,498 | 12/1951 | Jenny | 62—13 |
| 2,762,208 | 9/1956 | Dennis | 62—27 X |
| 2,763,137 | 9/1956 | Collins | 62—29 X |
| 2,788,646 | 4/1957 | Rice | 62—14 X |
| 2,881,595 | 4/1959 | Fetterman | 62—13 |
| 2,924,078 | 2/1960 | Taunoda. | |
| 2,964,914 | 12/1960 | Schuftan | 62—29 X |

NORMAN YUDKOFF, *Primary Examiner.*